United States Patent
Ji et al.

(10) Patent No.: US 8,125,969 B2
(45) Date of Patent: Feb. 28, 2012

(54) METHOD AND APPARATUS FOR ADJUSTING EDCA CHANNEL ACCESS PARAMETERS

(75) Inventors: Lusheng Ji, Randolph, NJ (US); Robert R. Miller, II, Convent Station, NJ (US); Harry R. Worstell, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 531 days.

(21) Appl. No.: 12/336,069

(22) Filed: Dec. 16, 2008

(65) Prior Publication Data

US 2010/0150116 A1    Jun. 17, 2010

(51) Int. Cl.
*H04W 4/00* (2009.01)

(52) U.S. Cl. ........................ 370/338; 370/230

(58) Field of Classification Search .................. 370/230, 370/338

See application file for complete search history.

(56) References Cited

U.S. PATENT DOCUMENTS

| | | | |
|---|---|---|---|
| 2006/0187840 A1 | 8/2006 | Cuffaro et al. | |
| 2006/0215686 A1 | 9/2006 | Takeuchi | |
| 2008/0095124 A1 | 4/2008 | Ramos et al. | |
| 2009/0067326 A1* | 3/2009 | Perrot et al. | 370/230 |

OTHER PUBLICATIONS

U.S. Appl. No. 12/276,836, filed Nov. 24, 2008.

* cited by examiner

*Primary Examiner* — Phuc Tran

(57) ABSTRACT

A contention based communications channel access method emulates scheduled access by dynamically updating Enhanced Distribution Channel Access (EDCA) parameters for groups of member stations in a Wireless Local Area Network (WLAN).

21 Claims, 4 Drawing Sheets

METHOD AND APPARATUS FOR ADJUSTING EDCA CHANNEL ACCESS PARAMETERS

FIELD

This disclosed technology relates generally to Wireless Local Area Networks (WLANs) and more particularly to accessing communications channels in WLANs.

BACKGROUND

In a Wireless Local Area Network (WLAN) an Access Point (AP) can communicate with each of a plurality of member stations, over a communications channel. Each member station may be, for example, a cellular telephone, a portable computer, or any other wireless receiver and transmitter unit.

As defined by IEEE 802.11 WLAN standards, there are two main communications-channel access-methods by which a member station communicates with an Access Point (AP) in a Wireless Local Area Network (WLAN). One of these methods is scheduled access and the other is contention-based access. In a scheduled access approach, an Access Point (AP) polls each of its member stations and each member station can only transmit over a communications channel after being polled. Since only one member station communicates over a communications channel at a time, there can be no conflict between member stations, and therefore contention resolution algorithms are not needed. Thus in a scheduled access method, the overall efficiency is high and the Quality of Service (QoS) that each member station receives is guaranteed by a polling schedule. Unfortunately, the majority of WLAN hardware available today does not support scheduled access.

The majority of WLAN hardware today implement a contention-based method, in particular the Carrier Sense Multiple Access Collision Avoidance (CSMA-CA) method. In this contention based approach, a member station is not polled, but rather when the member station wants to transmit to the Access Point over the communications channel, it first senses whether the channel is available. If the channel is determined to be busy, the particular member station will wait for a waiting time period before attempting to transmit again. The waiting time period includes an Arbitration Inter-Frame Space (AIFS) followed by a Contention Window (CW). Only if the communications channel remains idle during the whole waiting time period may the particular member station begin its transmission over the communications channel to the Access Point.

The use of a waiting time period in a contention based approach reduces the possibility of transmission collisions: two member stations transmitting over a communications channel at the same time. However, the waiting time period results in delays in packet transmission from the member stations to the Access Point (AP).

The waiting time period in the contention based approach of CSMA-CA is determined by several parameters. The Arbitration Inter-Frame Space (AIFS) is determined by a configuration parameter called Arbitration Inter-Frame Space Number (AIFSN), which specifies the length of the AIFS in terms of time slots. The Contention Window (CW) for a particular transmission is determined randomly between 0 and an upper bound. The initial upper bound is a parameter called minimum CW, or CWmin. Every time a transmission fails, the upper bound is doubled until it reaches the maximum upper bound, which is the called CWmax.

The parameters AIFSN, CWmin, and CWmax have been set differently for different Quality of Service (QoS) classes. Setting theses parameters lower results in shorter wait times and a greater likelihood of access (i.e. a higher access priority) to a communications channel. For example, a voice data quality of service class might have lower AIFSN, CWmin, and CWmax values than a video quality of service class, resulting in a greater likelihood of transmission of voice data then video data over a communications channel. Setting these channel access parameters differently for different data traffic or communication classes is known as Enhanced Distributed Channel Access (EDCA) and the parameters AIFSN, CWmin, and CWmax can be called EDCA parameters.

EDCA offers no quality of service (QoS) guarantee to individual traffic streams. It only offers statistically higher channel access probability to communication traffic of higher Quality of service (QoS) classes. Traffic streams within the same service class still rely on contention based resolution methods to compete for channel access. Channel access is not efficient because of the time spent resolving contentions. As the number of traffic streams increases, such as with an increase in the number of member stations in a Wireless Local Area Network (WLAN), the number of traffic streams belonging to the same class will increase resulting in more contentions. In addition, since traffic streams of the same Quality of Service (QoS) class are treated the same, they have the same opportunity of transmission, which may not be desirable.

U.S. published patent application no. 2006/0187840 A1 to Cuffaro et al., discloses a method of modifying contention windows and Arbitration Inter-Frame Space (AIFS) for low priority traffic when congestion is detected on a wireless medium. A contention window associated with low priority traffic is incremented and a processor updates an EDCA parameter set included in frames transmitted by a transmitter. The size of the AIFS can be increased in parallel with the increase in the contention window.

SUMMARY

The disclosed technology, in one embodiment, provides a contention-based communications channel access method, which emulates scheduled access by dynamically updating Enhanced Distribution Channel Access (EDCA) parameters for groups of member stations in a Wireless Local Area Network (WLAN).

A Wireless Local Area Network (WLAN) may include a Basic Service Set (BSS) comprised of at least a first group of member stations and a second group of member stations. In one embodiment, either or both groups of member stations may have only a single member station. A method in accordance with an embodiment of the present disclosed technology, may further include setting EDCA parameters for the first group of member stations so that the first group of member stations has a first level of access priority to a communications channel during a first channel access throttling time period. The method may further include setting EDCA parameters for the second group of member stations so that the second group of member stations has a second level of access priority to the communications channel during the first channel access throttling time period.

During a second channel access throttling time period EDCA parameters for the second group of member stations may be set so that the second group of member stations has a third level of access priority to the communications channel. The EDCA parameters for the first group of member stations may be set during the second channel access throttling time period so that the first group of member stations has a fourth level of access priority to the communications channel. The first level of access priority may be higher than the second level of access priority, and the third level of access priority may be higher than the fourth level of access priority.

The first level of access priority may be equal to the third level of access priority, while the second level of access priority may be equal to the fourth level of access priority. The method may further include repeating the first channel access throttling time period and the second channel access throttling time period.

The Basic Service Set (BSS) may be comprised of a plurality of further groups of member stations. A group of member stations may be given a higher level of access priority while the other groups of member stations are given a lower level of access priority, during a particular channel access throttling time period. In this manner, each group of member stations is given a channel access throttling time period during which it will be much easier for the particular group of member stations to transmit over the communications channel than it will be for other groups of member stations. The EDCA parameters, which may be modified, may include an Arbitration Interframe Space Number, a minimum contention window, and a maximum contention window.

DETAILED DESCRIPTION OF THE DRAWINGS

In one or more embodiments of the disclosed technology, a contention based communications channel access method is provided which emulates scheduled access by dynamically updating Enhanced Distribution Channel Access (EDCA) parameters for groups of member stations in a Wireless Local Area Network (WLAN). An access point (AP) performs an operation called "channel access throttling" (CAT), which increases or decreases the communications channel access probability of groups of member stations by adjusting their EDCA channel access parameters.

Figure 1:
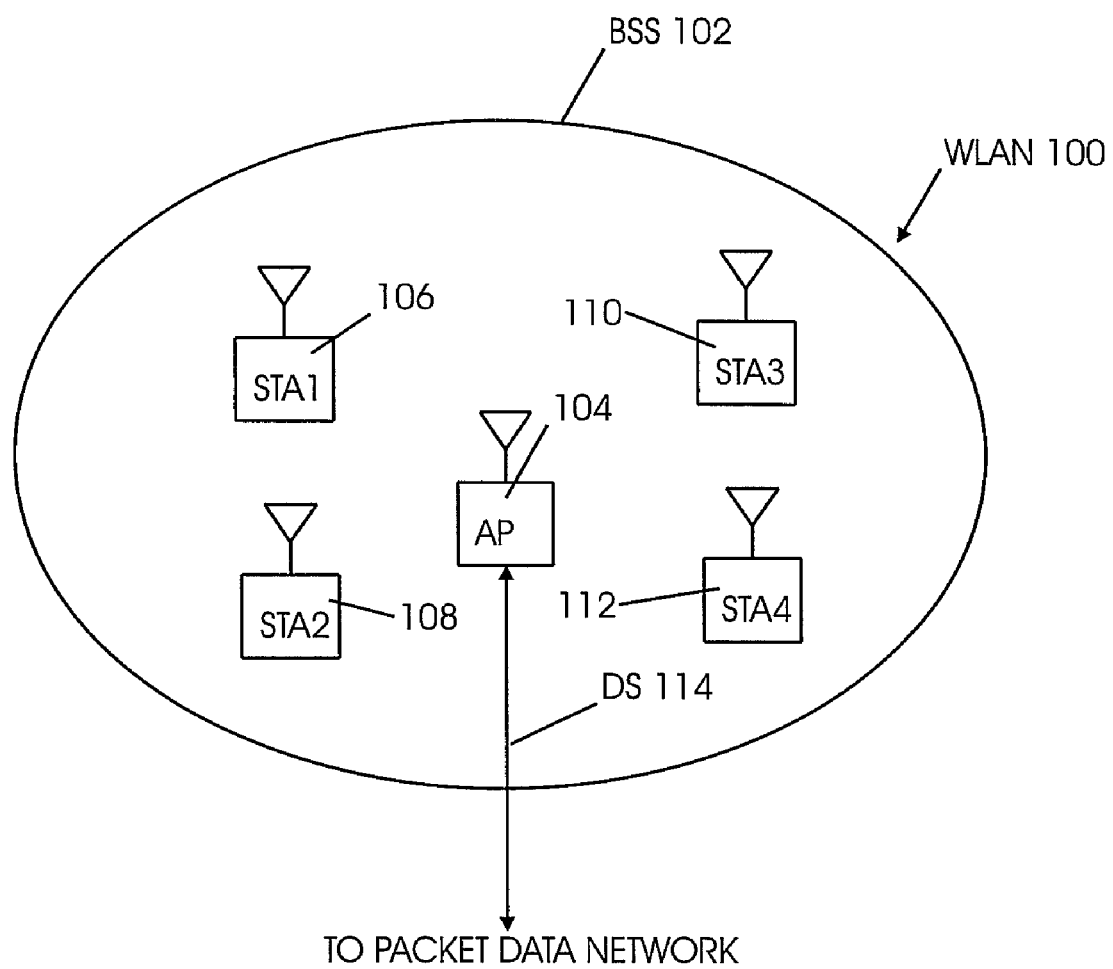
FIG. 1 shows a high-level schematic of a Wireless Local Area Network (WLAN) with a single access point.

FIG. 1 shows a high-level schematic of a Wireless Local Area Network (WLAN) 100 with a single access point (AP) 104. The WLAN 100 further includes member stations STA1 106, STA2 108, STA3 110, and STA4 112. The member stations 106, 108, 110, and 112 are part of a Wireless Local Area Network cell called a Basic Service Set (BSS) 102. The access point (AP) 104 communicates with each of the member stations 106, 108, 110, and 112 over a wireless communications channel. The access point (AP) 104 communicates to a packet data network, details not shown, through a distribution system DS 114.

Figure 2:
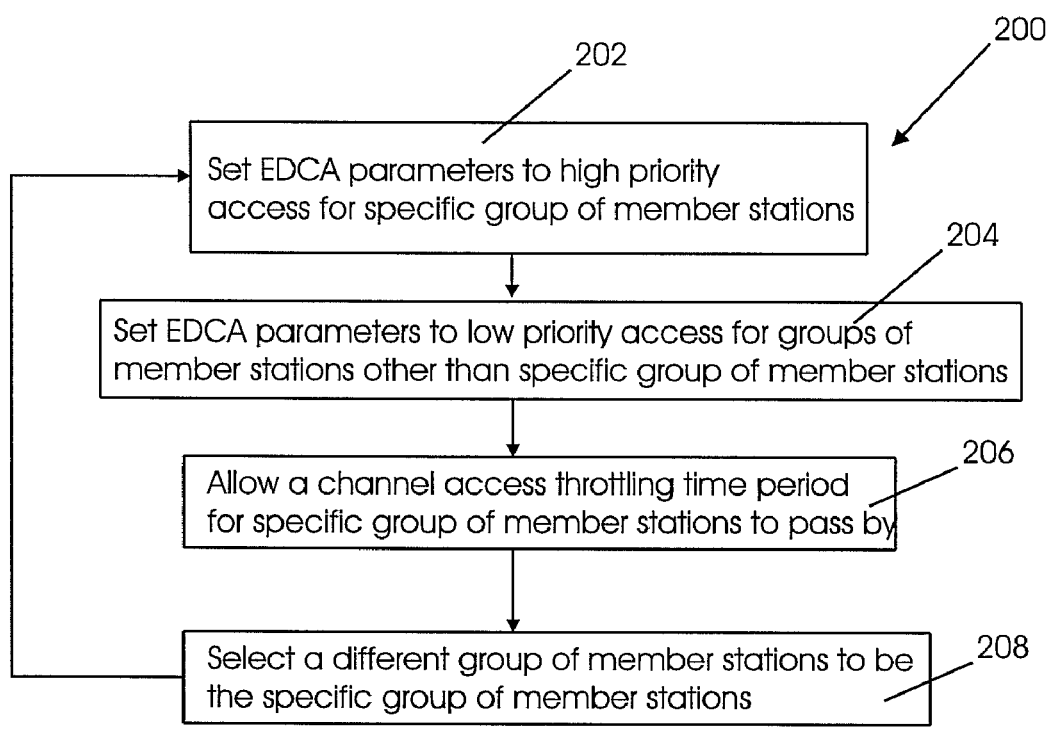
FIG. 2 shows a flow chart of a method in accordance with an embodiment of the present disclosed technology.

FIG. 2 shows a flow chart 200 of a method in accordance with an embodiment of the present disclosed technology. The method of FIG. 2 may be executed by the access point (AP) 104. The access point (AP) 104 may be a computer, such as a computer 400 shown in FIG. 4.

At step 202 of the flow chart 200, the access point (AP) 104 may set EDCA parameters for a specific group of member stations to high priority access. For example, the AP 104 may set EDCA parameters for a group of member stations which may include member station STA1 106 and member station STA2 108, to high priority access. In step 204, the access point (AP) 104 may set EDCA parameters for groups of member stations other than the specific group of member stations to low priority access. In this example, the AP 104 may set EDCA parameters for STA3 110 and STA4 112 to low priority access.

The AP 104 may then leave the EDCA parameters unchanged for a channel access throttling time period. After the channel access throttling time period has passed, the AP 104 may then select a different group of member stations to be the specific group of member stations. In this example, the AP 104 may next select a group of member stations including STA3 110 and STA4 112 to be the specific group of member stations. The method then loops back to step 202 and the EDCA parameters for the new specific group of member stations (STA3 110 and STA4 112) is set to high priority access while the groups other than the new specific group (STA1 106, and STA2 108) is set to low priority access at step 204. The method of FIG. 2 can be repeated for a plurality of groups of member stations, and after each group has had the opportunity to have high priority access, while other member stations have low priority access, the method of FIG. 2 can be cycled through again starting with the first group of member stations. The order in which each group of member stations receives higher priority access can also be changed.

The AP 104 may set EDCA parameters by including a special Information Element (IE) called the EDCA parameter set in its beacon messages or signals and in several other management messages or signals. The IE describes detailed configurations for EDCA channel related parameters such as Contention Window (CW) bounds for each Quality of Service (QoS) class. EDCA channel related parameters enclosed in the EDCA parameter set IE are applied to all member stations of the BSS. There is no field for including intended receivers for the intended receivers of the EDCA channel related parameters in the IE either. All member stations, such as stations STA1 106, STA2 108, STA3 110, and STA4 112 shown in FIG. 1, receive the beacon message or signal and in response change their EDCA channel access parameters according to the IE in the beacon message or signal or other management messages or signals. The details of the Information Element (IE) are explained in the IEEE 802.11 standard.

The access point (AP) 104 may issue or transmit a special EDCA parameter adjustment message or signal over a communications channel to the member stations STA1 106, STA2 108, STA3 110, and STA4 112 of the WLAN 100 in FIG. 1. The AP 104 may issue or transmit the special EDCA parameter adjustment message or signal in a manner similar to a polling message or signal in scheduled access. Inside of these EDCA adjustment messages the AP 104 may enclose special EDCA parameter configurations for groups of member stations or individual member stations to differentiate channel access priorities among them and give one particular member station or particular group of member stations elevated channel access priority relative to the rest of the member stations. As a result, the particular or specified member station or group of member stations will have preferred channel access priority and likely succeed in accessing the communications channel. Such a special EDCA parameter adjustment message or signal may be transmitted whenever an AP, such as AP 104 needs to change channel access priority for its member stations. In an alternative embodiment the special EDCA parameter adjustment message may carry special time elements describing the time interval that the enclosed EDCA parameters should be applied by the specified member stations. Yet in another alternative embodiment the same information transmitted by the special EDCA parameter adjustment message can be embedded in the beacon messages and transmitted as a special IE.

Each specific group of member stations referred to in step 202 of FIG. 2 can include only one member station, such as only one of member stations STA1 106, STA2 108, STA3 110, and STA 4 112. The EDCA parameters may include an Arbitration Inter-Frame Space Number (AIFSN), a minimum contention window (CWmin), and a maximum contention window (CWmax) for a member station or a group of member stations. One or more of these EDCA parameters may be set to give higher priority to a specific group of member stations. The Arbitration Inter-Frame Space Number (AIFSN), a minimum contention window (CWmin), and a maximum contention window (CWmax) are lowered to give a shorter waiting time and therefore higher priority for a particular member station or group of member stations. The Arbitration Inter-Frame Space Number (AIFSN), a minimum contention window (CWmin), and a maximum contention window (CWmax) are raised to give a longer waiting time and therefore lower priority for a particular member station or group of member stations.

The channel access priorities can be rotated among groups of member stations or among individual member stations by the access point (AP) 104. The access point (AP) 104 can compute, construct, and execute a schedule for EDCA parameter rotation that balances the Quality of Service (QoS) requirements of all member stations.

When a channel access throttling time period ends, the member stations roll back their EDCA parameters to what they were prior to the beginning of a channel access throttling period (i.e. the default EDCA parameters), unless the EDCA parameters are set in accordance with a new channel access throttling time period. A period that a member station or group of member stations channel access priority is raised can be called a channel access throttling (CAT) high period, and a period that a member station or group of member stations channel access priority is lowered can be called a channel access throttling (CAT) low period.

Figure 3:
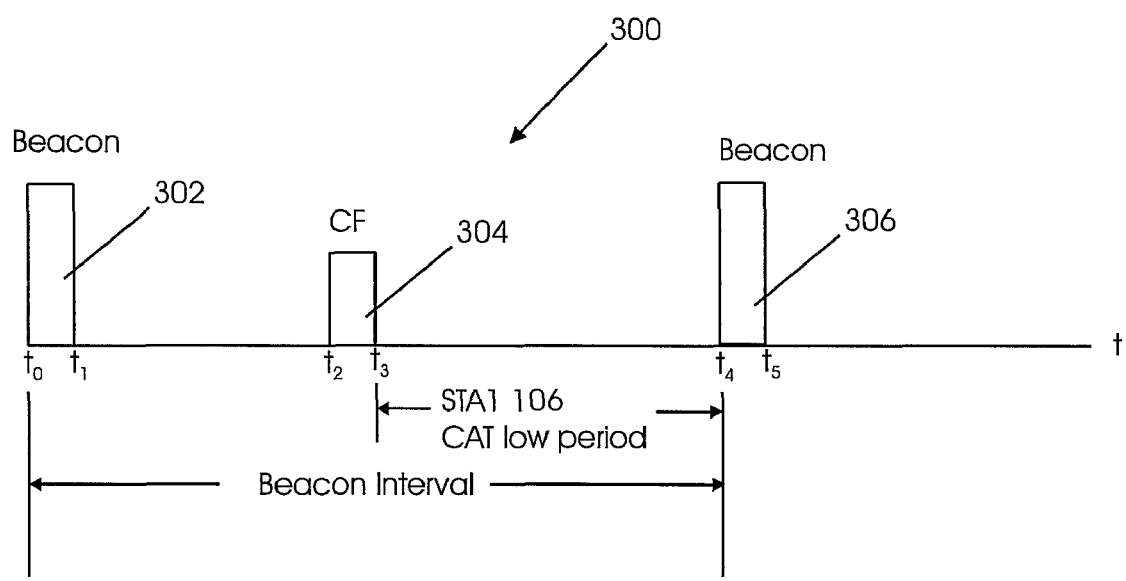
FIG. 3 shows a message or signal timing diagram.

FIG. 3 shows an exemplary timing diagram 300 of signals or messages transmitted from access point (AP) 104, graphed versus time (t). The AP 104 starts transmitting a beacon signal or message over a wireless communications channel, at time $t_0$ and stops transmitting the beacon message or signal at time $t_1$. The level of the bar shown for beacon message or signal 302 may indicate an amplitude of the beacon message or signal.

To start a channel access throttling (CAT) period, the AP 104 transmits a CAT Frame (CF) signal or message 304 from time t2 to time t3. The CF signal or message 304 is transmitted from the AP 104 out onto a wireless communications channel to all of the member stations, including STA1 106, STA2 108, STA3 110, and STA4 112, in the Basic Service Set 102 of the WLAN 100 shown in FIG. 1. In this example, the CF message or signal 304, when received by the STA1 106, causes the STA1 106 to change its EDCA parameters (such as AIFSN, and Contention Window time periods CWmin, and CWmax) from default values to higher values, which will increase the waiting time period for STA1 106 and result in lower access priority for STA1 106. The period of time from t3 to t4, in this example, is called a CAT low period (lower access priority) for STA1 106 because the EDCA parameters are set high to cause a lower access priority for STA1 106, than STA1 106 would have with its default EDCA parameters. The time $t_4$ is the start of the next beacon message or signal 306, and the time $t_5$ is the end of the beacon signal or message 306. The difference between the start times of two consecutive beacon signals or messages is called the beacon interval.

To those skilled in the art, various uses of a special EDCA parameter adjustment message and a beacon embedded special EDCA parameter adjustment IE, combined with an EDCA parameter set IE of the IEEE 802.11 standard, can be derived to accomplish different goals. For example, an AP, such as AP 104, may use an EDCA parameter set IE to establish default EDCA parameters for all member stations, such as member stations 106, 108, 110, and 112 of a BSS, such as BSS 102. Then the particular AP, such as AP 104, may use a beacon embedded special EDCA parameter adjustment IE to schedule CAT periods that repeatedly appear in each beacon interval. Then the particular AP, such as AP 104, may also use special EDCA parameter adjustment messages to schedule additional CAT periods when necessary. The special EDCA parameter adjustment messages may be addressed to one member station, such as one of 106, 108, 110, and 112, if the enclosed EDCA parameter settings only applies to that particular member station, or addressed to multiple member stations in ways that are considered as known art. The special EDCA parameter adjustment messages may even be addressed to a non-existent member station, in which case effectively the particular AP, such as AP 104, creates "vacant" time slots, which can be used by entities external to the particular BSS, such as BSS 102. Such entities can be members of other co-located BSSes, or even by non-Wi-Fi (trademarked) devices using other CSMA type of channel access technologies such as ZigBee (IEEE 802.15.4). A "Wi-Fi" device is a wireless local area network (WLAN) product that is based on the Institute of Electrical and Electronics Engineers' (IEEE) 802.11 standards. "Wi-Fi" is a registered trademark. "ZigBee" is the name of a specification for a suite of high level communication protocols using small, low-power digital radios based on the IEEE 802.15.4-2006 standard for wireless personal area networks (WPANs), such as wireless headphones connecting with cell phones via short-range radio. The ZigBee technology is intended to be simpler and less expensive than other WPANs, such as Bluetooth. ZigBee is targeted at radio-frequency (RF) applications that require a low data rate, long battery life, and secure networking.

In the disclosed technology, the initial beacon message or signal 302 may set default EDCA parameters, which may be differentiated by Quality of Service (QoS). The time period when channel access throttling is not used for any member stations, but rather default EDCA parameters are used, may be called a default time period. Currently there are four different classes of Quality of Service (QoS): voice, video, background, and best effort. However, currently an initial beacon message or signal of the prior art does not differentiate EDCA parameters among member stations or groups of member stations.

The AP 104 may use the CAT frame (CF) signal or message 304 to instruct a member station or group of member stations to set its EDCA parameters to values different from default values. For example, the AP 104 may transmit or issue a command or CF 304 for the member station STA1 106 to set its EDCA parameters to CWmin=CWmax=1023, and Arbitration Interframe Space Number (AIFSN) to 7, and a channel access throttling time period using these EDCA parameters may begin at time $t_3$ and last until the end of the beacon interval at time $t_4$. Because the default EDCA parameters for STA1 106, in this example, are lower than the channel access throttling time period EDCA parameters, this configuration defines a CAT low period (low priority access) for STA1 106. During the STA1 106 CAT low period from $t_3$ to $t_4$ other member stations, such as member stations 108, 110, and 112, have higher channel access priority than member station STA1 106. Thus, this CF signal, message, or command 304 effectively "polls" all other member stations (108, 110, and 112), other than member station STA1 106. The transmission opportunity window given to the "polled" member stations in this example is from immediately after the command message or signal CF 304 (time $t_3$) until the beginning of the next beacon interval (time $t_4$).

The AP 104 may use the CAT command message or signal in various ways. For example, the AP 104 may raise the EDCA parameters (thus raising the waiting time period) for certain member stations to implicitly poll other member stations. The AP 104 may alternatively lower the EDCA parameters (thus lowering the waiting time period) for certain member stations to explicitly poll these member stations. The AP 104 may also raise the EDCA parameters for some member stations while at the same time lowering the EDCA parameters for other member stations to enhance the priority difference between polled member stations and other member stations. The AP 104 may also schedule recurrent channel access throttling (CAT) operations. The AP 104 may also differentiate the channel access priorities that different classes of either the "polled" members or not "polled" members get by assigning different parameters to them.

Figure 4:
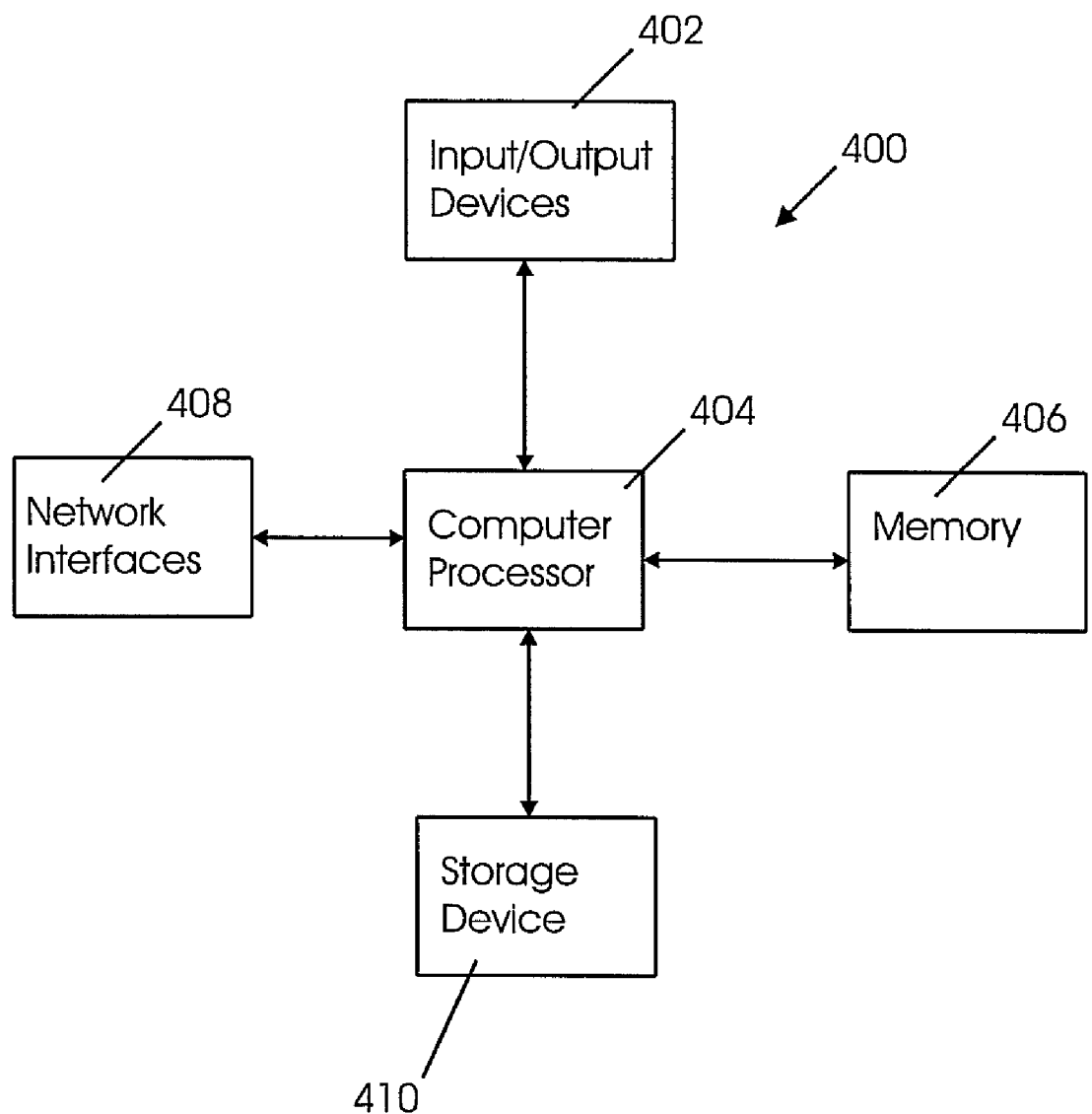
FIG. 4 shows a high level block diagram of a computer.

A high-level block diagram of a computer 400 is illustrated in FIG. 4. The access point 104, or any of the member stations 106, 108, 110, and 112, may include a computer similar to or identical to the computer 400. Computer 400 contains a processor 404, which controls the overall operation of the computer 400 by executing computer program instructions, which define such operation. The computer program instructions may be stored in a storage device 410 or other computer readable medium (e.g., magnetic disk, CD ROM, etc.), and loaded into a memory 406 when execution of the computer program instructions is desired. Thus, the method steps of FIG. 2 can be defined by the computer program instructions stored in the memory 406 and/or storage device 410 and controlled by the processor 404 executing the computer program instructions. For example, the computer program instructions can be implemented as computer executable code programmed by one skilled in the art to perform an algorithm defined by the method steps of FIG. 2. Accordingly, by executing the computer program instructions, the processor 404 executes an algorithm defined by the method steps of FIG. 2. The computer 400 also includes one or more network interfaces 308 for communicating with other devices via a network. The computer 400 also includes input/output devices 402 that enable user interaction with the computer 400 (e.g., display, keyboard, mouse, speakers, buttons, etc.) One skilled in the art will recognize that an implementation of an actual computer could contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A method of dynamically changing Enhanced Distributed Channel Access (EDCA) parameters for a Basic Service Set (BSS) in a Wireless Local Area Network (WLAN), the BSS comprised of at least a first group of member stations and a second group of member stations, the method comprising:

setting one or more EDCA parameters for the first group of member stations so that the first group of member stations has a first level of access priority to a communications channel during a first channel access throttling time period;

wherein the first level of access priority is different from a default level of access priority for the first group of member stations;

wherein the second group of member stations has a different level of access priority than the first group of member stations during the first channel access throttling time period; and wherein each of the first and second groups of member stations have the same level of access priority during a default time period.

2. The method of claim 1 further comprising
setting EDCA parameters for the second group of member stations so that the second group of member stations has a second level of access priority to the communications channel during the first channel access throttling time period.

3. The method of claim 2 further comprising:
setting EDCA parameters for the second group of member stations so that the second group of member stations has a third level of access priority to the communications channel during a second channel access throttling time period;

setting EDCA parameters for the first group of member stations so that the first group of member stations has a fourth level of access priority to the communications channel during the second channel access throttling time period; and wherein the first level of access priority is higher than the second level of access priority; and wherein the third level of access priority is higher than the fourth level of access priority.

4. The method of claim 3 wherein
the first level of access priority is equal to the third level of access priority;
and the second level of access priority is equal to the fourth level of access priority.

5. The method of claim 4 further comprising
repeating the steps of claim 1 for a plurality of first channel access throttling time periods, and for a plurality of second channel access throttling time periods, the access priority for each channel during the access throttling time period being redetermined.

6. The method of claim 4 wherein the BSS is comprised of a plurality of further groups of member stations and further comprising:

setting EDCA parameters for each of the plurality of further groups of member stations so that each of the plurality of further groups of member stations has the second level of access priority to the communications channel during the first and the second channel access throttling periods;

and setting EDCA parameters for each of the plurality of further groups of member stations during a plurality of further channel access throttling time periods so that each of the plurality of further groups of member stations has the first level of access priority during only one of the plurality of further channel access throttling time periods, while the first, second, and other groups of member stations of the plurality of further groups of member stations have the second level of access priority.

7. The method of claim 1 wherein
the EDCA parameters include an Arbitration Interframe Space Number.

8. The method of claim 1 wherein
the EDCA parameters include a minimum contention window.

9. The method of claim 1 wherein
the EDCA parameters include a maximum contention window.

10. The method of claim 1 wherein each group of member stations has only a single member station.

11. An apparatus for dynamically changing Enhanced Distributed Channel Access (EDCA) parameters for a Basic Service Set (BSS) in a Wireless Local Area Network (WLAN), the BSS comprised of at least a first group of member stations and a second group of member stations, the apparatus comprising
means for setting one or more EDCA parameters for the first group of member stations so that the first group of member stations has a first level of access priority to a communications channel during a first channel access throttling time period;
wherein the first level of access priority is different from a default level of access priority of the first group of member stations; and
wherein the second group of member stations has a different level of access priority than the first group of member stations during the first channel access throttling time period; and
wherein each of the first and second groups of member stations have the same level of access priority during a default time period.

12. The apparatus of claim 11 further comprising
means for setting EDCA parameters for the second group of member stations so that the second group of member stations has a second level of access priority to the communications channel during the first channel access throttling time period;
means for setting EDCA parameters for the second group of member stations so that the second group of member stations has a third level of access priority to the communications channel during second channel access throttling time period;
means for setting EDCA parameters for the first group of member stations so that the first group of member stations has a fourth level of access priority to the communications channel during the second channel access throttling time period; and
wherein the first level of access priority is higher than the second level of access priority; and
wherein the third level of access priority is higher than the fourth level of access priority.

13. The apparatus of claim 12 wherein
the first level of access priority is equal to the third level of access priority;
and the second level of access priority is equal to the fourth level of access priority.

14. The apparatus of claim 12 wherein the BSS is comprised of a plurality of further groups of member stations and further comprising:
means for setting EDCA parameters for each of the plurality of further groups of member stations so that each of the plurality of further groups of member stations has the second level of access priority to the communications channel during the first and the second channel access throttling time periods; and
means for setting EDCA parameters for each of the plurality of further groups of member stations during a plurality of further groups of member stations during a plurality of further channel access throttling time periods so that each of the plurality of further groups of member stations has the first level of access priority during only one of the plurality of further channel access throttling time periods, while the first, second, and other groups of member stations of the plurality of further groups of member stations have the second level of access priority.

15. The apparatus of claim 11 wherein
the EDCA parameters include an Arbitration Interframe Space Number.

16. The apparatus of claim 11 wherein
The EDCA parameters include a minimum contention window.

17. The apparatus of claim 11 wherein
The EDCA parameters include a maximum contention window.

18. The apparatus of claim 11 wherein
each group of member stations has only a single member station.

19. A method of dynamically changing Enhanced Distributed Channel Access (EDCA) parameters, the method comprising
using an Access Point (AP) of a first Basic Service Set (BSS) in a Wireless Local Area Network (WLAN) to set one or more EDCA parameters for a first group of member stations outside of the first BSS, the first BSS comprised of at least a second group of member stations, so that the first group of member stations has a first level of access priority to a communications channel during a first channel access throttling time period;
wherein the first level of access priority is different form a default level of access priority of for the first group of member stations;
wherein the second group of member stations has a lower level of access priority than the first group of member stations during the first channel access throttling time period.

20. The method of claim 19 wherein
the first group of member stations are not Wi-Fi devices.

21. The method of claim 19 wherein
the first group of member stations are located in a second BSS, which is adjacent to the first BSS.

* * * * *